United States Patent [19]

D'Addio et al.

[11] Patent Number: 4,636,793
[45] Date of Patent: Jan. 13, 1987

[54] ADAPTIVE MTD DIGITAL PROCESSOR FOR SURVEILLANCE RADAR

[75] Inventors: Egidio D'Addio, Naples; Gaspare Galati; Ennio Giaccari, both of Rome, all of Italy

[73] Assignee: Selenia - Industrie Elettroniche Associate S.p.A., Rome, Italy

[21] Appl. No.: 631,037

[22] Filed: Jul. 16, 1984

[30] Foreign Application Priority Data

Jul. 15, 1983 [IT] Italy .............................. 48701 A/83

[51] Int. Cl.$^4$ ............................................. G01S 13/52
[52] U.S. Cl. ................................................ 342/162
[58] Field of Search ............................. 343/7.7, 5 CF

[56] References Cited

U.S. PATENT DOCUMENTS

| 4,375,640 | 3/1983 | Harvey | 343/5 CF |
| 4,463,356 | 7/1984 | Short, III et al. | 343/7.7 |
| 4,488,154 | 12/1984 | Ward | 343/7.7 |

OTHER PUBLICATIONS

Introduction to Radar Systems—Second Edition—Merrill I. Skolnik—pp. 127–129.
MTI Radar—edited by D. Curtis Schleher, Ph.d., pp. 176–182.
"Moving Target Detector, An Improved Signal Processor—C. E. Muehe—pp. 142–145.
Automated Tracking for Aircraft Surveillance Radar Systems—C. E. Muehe—pp. 508–516.
Report No. FAA-RD-80-77—Project Report—ATC-95—II-1-II-7.
Evaluation of the MTD in a High-Clutter Environment—John R. Anderson et al—pp. 219–224.
Sacrifices in Radar Clutter Suppression Due to Compromises in Implementation of Digital Doppler Filters—J. W. Taylor, Jr., pp. 46–50.
On the Azimuthal Accuracy of an FFT-Based Signal Processor for Air Traffic Control Radars—Egidio Cristofalo et al—pp. 8–16, vol. 7n. 1.
The Autogate Circuit in Radar Detection: Analysis and Comparison of Alternative Configurations—Gaspare Galati—pp. 19–29.

Primary Examiner—Thomas H. Tarcza
Assistant Examiner—Donald E. Hayes, Jr.
Attorney, Agent, or Firm—Karl F. Ross; Herbert Dubno

[57] ABSTRACT

A digital MTD processor interposed between a coherent video detector and a signal extractor of a surveillance radar comprises a plurality of Doppler filters connected in parallel to the video-detector output, including a zero filter, working into respective modulus extractors connected by way of respective threshold circuits to a common OR gate. Each threshold circuit includes a fixed-threshold comparator and an adaptive-threshold comparator with inputs connected in parallel to the output of the associated modulus extractor, either of these comparators being connectable to the OR gate via a switch controlled with the aid of a rain-clutter map so that the adaptive threshold is used only during exploration of regions with heavy rain. A ground-clutter map, which can be updated on the basis of level measurements performed on the output of the zero filter, controls the selective loading of each Doppler filter with one of three preselected sets of weights depending on the intensity of the ground clutter in the region being explored. Where ground clutter is heavy, the threshold circuit of the zero filter may be cut off from the OR gate. Both the fixed and the adaptive thresholds can be incremented in response to a command from the signal extractor generated upon the occurrence of an excessive number of false alarms.

7 Claims, 4 Drawing Figures

ADAPTIVE MTD DIGITAL PROCESSOR FOR SURVEILLANCE RADAR

FIELD OF THE INVENTION

Our present invention relates to a moving-target-detection (MTD) processor inserted between a coherent video detector and a signal extractor of a surveillance radar, e.g. as used for air-traffic control.

BACKGROUND OF THE INVENTION

Such processors generally comprise a bank of Doppler filters tuned to different Doppler frequencies within the unambiguous range established by the pulse-repetition frequency (PRF) of the radar. The filters are connected to the signal extractor of the radar by evaluation circuitry usually including a threshold circuit for the output of each filter. The operation of processors of the MTI (moving-target indicator) or the MTD type is well known in the art; reference may be made to the following publications:

[1] M. I. SKOLNIK, "Introduction to Radar Systems", $2^{nd}$ Edition, McGraw-Hill Book Co., New York, 1980.

[2] D. C. SCHLEHER, "MTI Radar", Artech House, 1978.

[3] C. E. MUEHE, "Moving-Target Detector, an Improved Signal Processor", AGARD Conference Proceedings No. 195, 14–17 June 1976, pp. 14-1 to 14-10.

[4] R. M. O'DONNELL and C. E. MUEHE, "Automated Tracking for Aircraft Surveillance Radar Systems", IEEE Transactions, Vol. AES 15, No. 4, July 1979, pp. 508–516.

[5] D. KARP and J. R. ANDERSON, "MTD-II Summary Report", MIT Lincoln Laboratory, ATC-95, June 1, 1981.

[6] J. R. ANDERSON and D. KARP, "Evaluation of the MTD in a High-Clutter Environment", IEEE International Radar Conference, 1980, pp. 219–224.

[7] J. W. TAYLOR, Jr., "Sacrifices in Radar Clutter Suppression Due to Compromises in Implementation of Digital Doppler Filters", Radar 82 Conference, London, 18–20 Oct. 1982, pp. 46–50.

[8] E. CRISTOFALO and G. GALATI, "On the Azimuthal Accuracy of an FFT-Based Signal Processor for Air Traffic Control Radars", Rivista Tecnica Selenia, Vol. 7, No. 1-1980, pp. 8–16.

The several threshold circuits may include fixed-threshold or adaptive-threshold comparators. An adaptive threshold, known as Autogate, is described in the following publication written by one of us in a periodical issued by our assignee:

[9] G. GALATI, "The 'Autogate' Circuit in Radar Detection: Analysis and Comparison of Alternative Configurations", Rivista Tecnica Selenia, Vol. 1, No. 3-1973, pp. 19–29.

A drawback of conventional MTD processors of the type referred to lies in the inalterability of their Doppler filters, preventing an optimization of their characteristics in the presence of difference environmental conditions such as the absence or presence of ground-clutter and rain-clutter interference.

Similarly, the presence of an adaptive threshold such as the Autogate is useful in the presence of heavy rain but is an unneeded encumbrance otherwise, resulting in a loss of sensitivity to useful targets to be detected.

OBJECTS OF THE INVENTION

Thus, the general object of our invention is to provide an improved processor in which these drawbacks are obviated.

A more particular object of our invention is to provide such a processor with several predetermined sets of filter weights designed to optimize its performance under certain distinct environmental conditions, specifically with (1) absence of ground clutter, (2) presence of light-to-moderate ground clutter and (3) presence of heavy ground clutter.

SUMMARY OF THE INVENTION

An MTD processor according to our invention comprises the usual multiplicity of Doppler filters with inputs connected in parallel to the coherent video detector of the radar through the intermediary of an analog/digital converter, followed by evaluation means working into the radar's signal extractor. Associated with each filter is a respective modification unit which, under the control of environment-responsive sensing means registering clutter distribution for the area surveyed by the radar, varies the characteristics of the associated filter.

More specifically, each modification unit advantageously comprises a selector loading the associated filter with one of several—preferably three—sets of predetermined weights stored in the unit, depending on the clutter density in the area being surveyed. That density may be read from a ground-clutter map, forming part of the sensing means, which can be updated by logic circuitry connected to the output of a zero filter, i.e. a filter with a narrow main lobe and very low sidelobes (around −40 dB with respect to the main-lobe level) tuned to a zero Doppler frequency. Since in regions of heavy ground clutter the contribution of this zero filter to the overall processor output will be negligible, we may provide switch means disconnecting the zero filter from the evaluation means during surveillance of such regions.

Pursuant to another important feature of our invention, threshold circuits forming part of the evaluation means and connected to respective filter outputs by way of associated modulus extractors and working into logical summing means such as an OR gate each comprise a fixed-threshold comparator and an adaptive-threshold comparator, connected in parallel to the output of corresponding modulus extractors, whose outputs are alternatively connectable to the summing means by switchover means controlled by a rain-clutter map forming part of the sensing means, with exclusion of the adaptive-threshold comparator during surveillance of regions of low and zero rainfall for increased sensitivity of target detection.

BRIEF DESCRIPTION OF THE DRAWING

The above and other features of our invention will now be described in detail with reference to the accompanying drawing in which.

SPECIFIC DESCRIPTION

Figure 1:
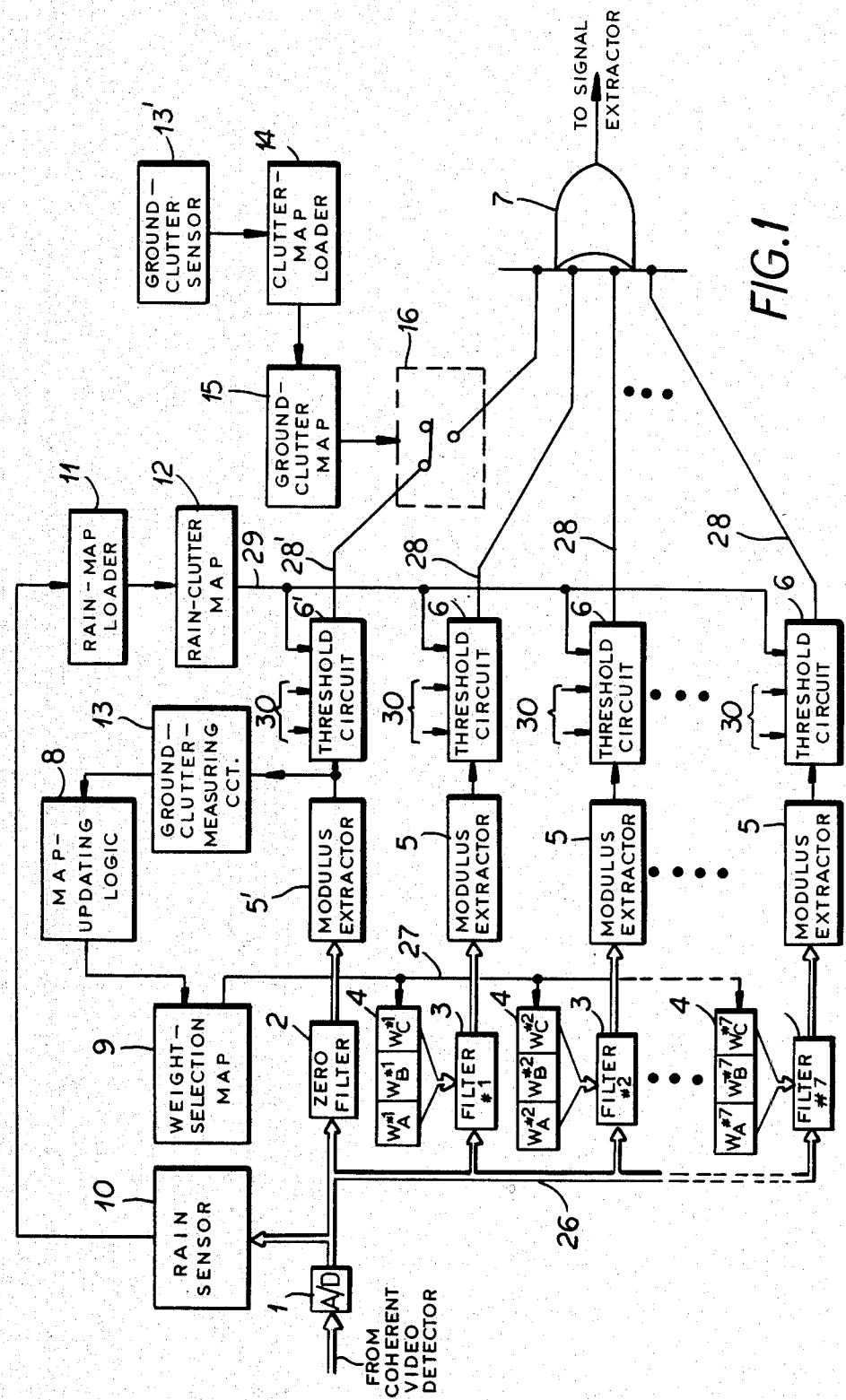
FIG. 1 is an overall block diagram of an adaptive MTD processor embodying our invention.

As indicated in FIG. 1, an MTD processor according to our invention is interposed between a coherent video detector and a signal extractor of a nonillustrated radar. An input stage of the processor, connected to the video detector, is an analog/digital converter 1 emitting 8-bit words or bytes on a bus 26. This bus extends, in parallel, to a rain sensor 10, a zero filter 2 and a bank of k (here seven) Doppler filters 3 of the transversal type, respectively designated #1 through #7. Each filter 3 is associated with a respective selector 4 storing three separate sets of predetermined weights $W_A$, $W_B$ and $W_C$ for the corresponding filters, each selector being operable by a signal on a line 27 to load one of these sets into its filter as more fully described hereinafter. The zero filter 2 works into a modulus extractor 5' while each of the other seven filters feeds a respective modulus extractor 5. The outputs of these extractors are connected to respective threshold circuits 6' and 6 having outgoing leads 28' and 28. All these eight leads, carrying binary signals, extend to respective inputs of an OR gate 7 which conducts whenever at least one lead emits a logical "1" to trigger the signal extractor of the radar via an overall detection logic not shown.

Modulus extractor 5' also supplies its output signal to a ground-clutter-measuring circuit 13 feeding a logic network 8 designed to update a weight-selection map 9 which panoramically registers the clutter distribution over an area swept by the radar antenna; components 13, 8 and 9 are, of course, synchronized with the antenna sweep so that map 9 reflects the degree of ground-clutter interference—as determined by zero filter 2—of each region explored by the radar. In the preferred embodiment being described, map 9 registers one of three different values A, B, C for the clutter condition of each area; value A pertains to regions free from ground clutter, value B is registered for regions of light to moderate ground clutter with a clutter-to-noise ratio (CNR) between 0 and 30 dB, and value C applies to regions of high ground clutter (CNR=30–45 dB). As each region is being surveyed, the corresponding value A, B or C is read out from map 9 on line 27 to cause filters 3 to be loaded by the associated selectors 4 with the corresponding set of weights $W_A$, $W_B$ or $W_C$. Parts of map 9 relating to regions of unchanging ground conditions will not require dynamic adjustment by updating logic 8.

With this arrangement, less severe filtering is used for regions with little or no interference from ground clutter with resulting increased Doppler sensitivity and a frequency response having a narrow main lobe and small sidelobes. The increased selectivity in these regions facilitates the detection of multiple targets and the ascertainment of their radial velocity. By the proper choice of weights, the central frequency of each filter can be brought in these instances close to its nominal value which is given by a whole multiple of the ratio between the PRF and the number of filters (here seven).

Whereas with known filters, such as those described in references [3] through [7], the weights utilized result in a reduction of the signal-to-noise ratio (SNR) by about 0.8 to 1.6 dB in comparison with the available maximum, the selective weighting according to our invention causes a loss of only 1 dB for weak clutter and 0.8 dB for absence of clutter.

Rain sensor 10 works into a logic network 11 serving to load a rain-clutter map 12 organized in a manner similar to that of weight-selection map 9. Map 12 has an output lead 29 extending to a control input of all threshold circuits 6' and 6 in order to modify the thresholds thereof as described hereinafter with reference to FIG. 4. Thus, each of these circuits contains a fixed threshold and an adaptive threshold, preferably of the Autogate type, which are connected in parallel to the associated modulus extractor 5' or 5 and are alternatively connectable to outgoing leads 28' or 28. The adaptive threshold is utilized only in regions for which map 12 registers heavy rainfall. Otherwise, the fixed threshold is used in order to avoid the loss of sensitivity caused by the Autogate; see reference [9]. That loss, which depends on the number of samples used, is here assumed to be around 1.5 dB for regions of heavy rainfall where the use of the Autogate is justified by the degree of interference. The fixed threshold is calculated off-line to provide optimum selectivity.

Both thresholds, however, may require occasional modification when it is desired to maintain an approximately constant false-alarm probability. Thus, an excess of false alarms detected by the logic of the signal extractor generates an incrementing command which is fed back to a pair of inputs 30 of each circuit 6', 6 in order to raise the threshold levels thereof.

In FIG. 1 we have further shown a switch 16, inserted in lead 28', which is designed to disconnect threshold circuit 6' from OR gate 7 during the exploration of regions of heavy ground clutter. Units 13', 14 and 15, shown separately for the sake of clarity, may in fact be part of components 13, 8 and 9.

Figure 2:
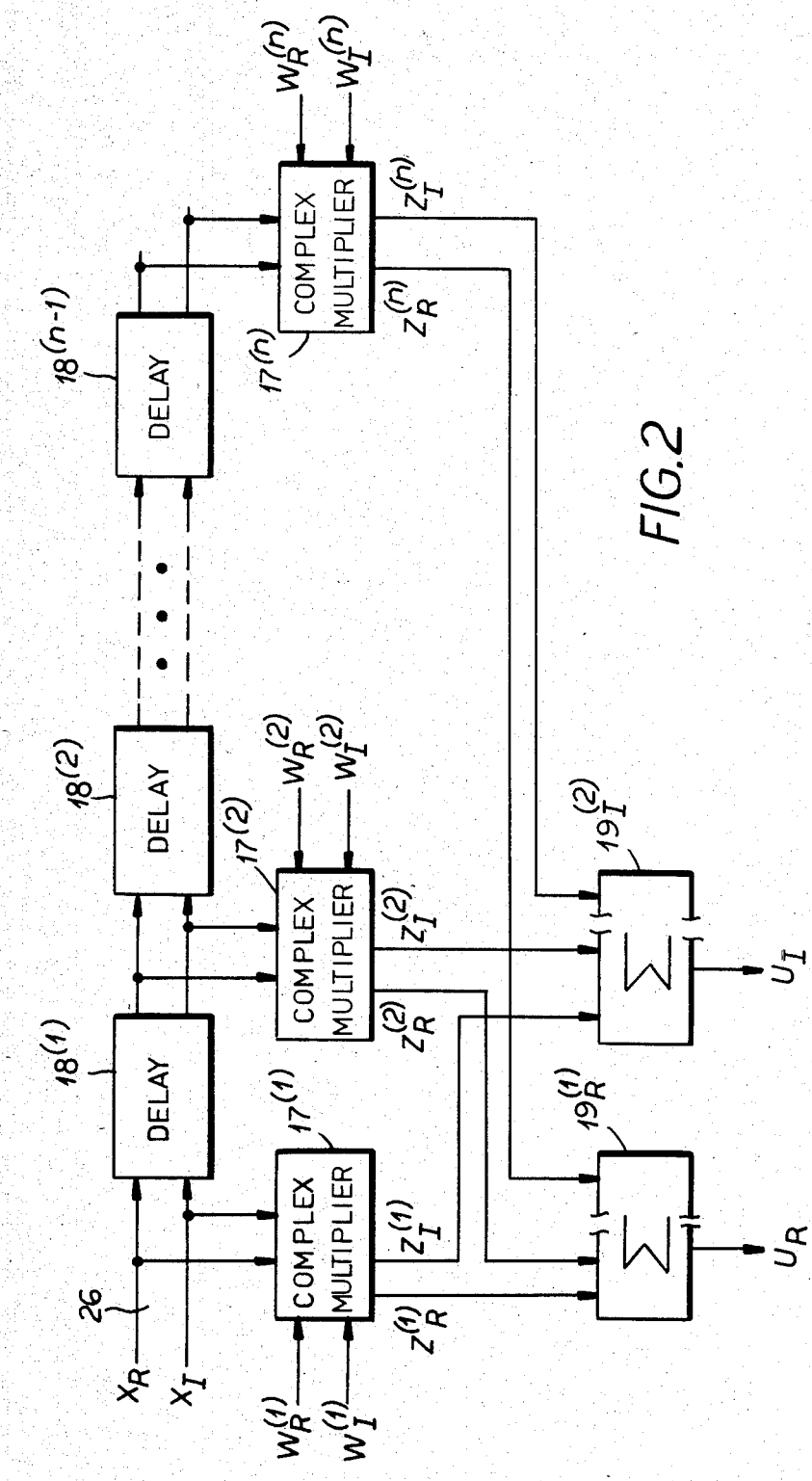
FIG. 2 shows details of a generic Doppler filter included in the processor of FIG. 1.

The weights $W_A$, $W_B$, $W_C$ stored in each selector 4 for determining the frequency response of the associated filter 3 are complex numbers with real and imaginary coefficients $W_R$ and $W_I$, respectively, as indicated in FIG. 2. Each of these coefficients, of which there are eight in a set, is expressed by a byte stored in a read-only memory of the associated selector 4. A generic transversal filter 3, illustrated in FIG. 2, receives from converter 1 via bus 26 two bytes $X_R$ and $X_I$ representing the digitized real and imaginary components of an incoming video signal. These coefficients are passed through a cascade of (n-1) delay circuits (with n=8 in this instance) $18^{(1)}$, $18^{(2)}$, ... $18^{(n-1)}$, and are also sent, ahead and back of each delay circuit, to respective complex multipliers $17^{(1)}$, $17^{(2)}$, ... $17^{(n)}$ receiving weight coefficients $W_R^{(1)}$ and $W_I^{(1)}$, $W_R^{(2)}$ and $W_I^{(2)}$, ... $W_R^{(n)}$ and $W_I^{(n)}$ from the associated selector. The resulting bits $Z_R^{(1)}$ and $Z_I^{(1)}$, $Z_R^{(2)}$ and $Z_I^{(2)}$, ... $Z_R^{(n)}$ and $Z_I^{(n)}$ are fed to a pair of summing circuits $19_R$ and $19_I$ delivering outgoing bits $U_R$ and $U_I$ to the associated modulus extractor 5 of FIG. 1.

The transversal filter 3 shown in FIG. 2 could be replaced by a recursive filter with only a single delay element 18, a single complex multiplier 17 and an accumulator emitting the bits $U_R$ and $U_I$; as is known in the art, in such a recursive filter the incoming value $X_R$, $X_I$ is repeatedly fed back from the delay circuit to the complex multiplier.

Figure 3:
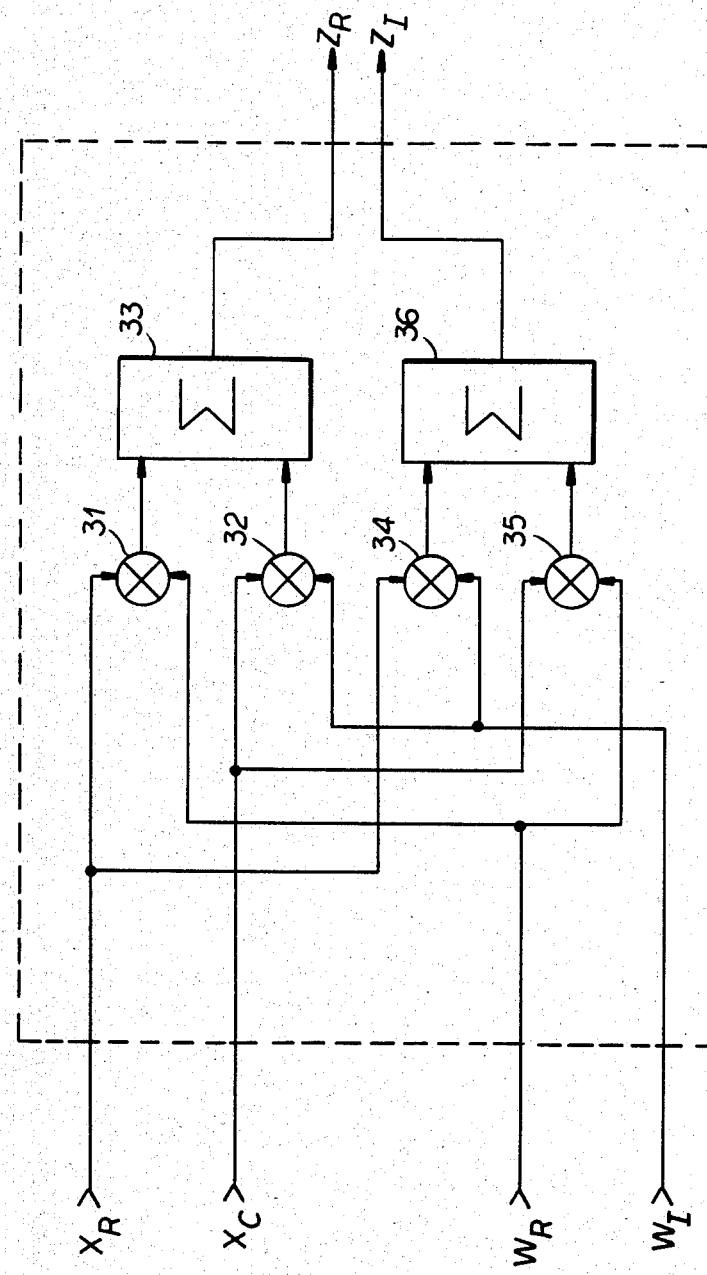
FIG. 3 shows details of a complex multiplier forming part of the filter of FIG. 2.

Details of such a multiplier 17 are shown in FIG. 3. The multiplier comprises a first pair of multiplication stages 31 and 32, forming the products $X_R \cdot W_R$ and $X_I \cdot W_I$, working into an adding circuit 33 delivering the real coefficient $Z_R$. A second pair of multiplication stages 34 and 35 form the products $X_R \cdot W_I$ and $X_I \cdot W_R$ which are fed to an adding circuit 36 delivering the imaginary coefficient $Z_I$.

Figure 4:
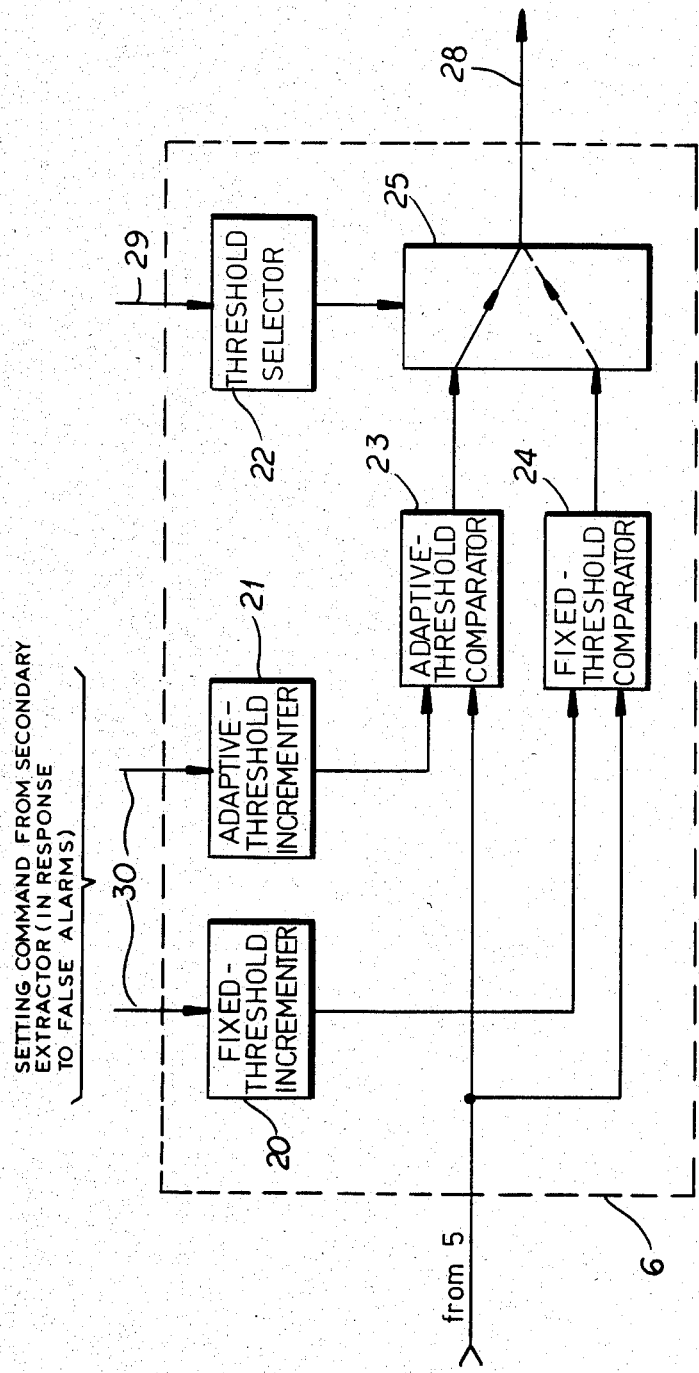
FIG. 4 shows details of a generic threshold circuit included in the processor of FIG. 1.

We shall now refer to FIG. 4 showing details of a representative threshold circuit 6. This circuit includes an adaptive-threshold comparator 23 of the Autogate type and a fixed-threshold comparator 24 as discussed above, with inputs connected in parallel to the lead coming from the associated modulus extractor 5. Output leads of comparators 23 and 24 are alternatively connectable to lead 28 by a switchover circuit 25 under the control of a threshold selector 22 receiving a binary signal from the output lead 29 of rain-clutter map 12 (FIG. 1). When that map registers heavy rainfall in a region being swept by the radar, circuit 25 extends the output lead of adaptive-threshold comparator 23 to lead 28 and thus to the logical summing circuit 7 of FIG. 1. Under all other conditions, the fixed-threshold comparator 24 is connected to lead 28. Also shown are a fixed-threshold incrementer 20 and an adaptive-threshold incrementer 21, responsive to the setting command on inputs 30 from the signal extractor of the radar, which serve to raise by one unit the thresholds of the two comparators whenever such a command indicates that the signal extractor has detected an excessive number of false alarms. Incrementers 20 and 21 could also operate as decrementers lowering the thresholds in response to an opposite command from the signal extractor in order to maintain a substantially constant false-alarm rate (CFAR).

In the following Tables I, II and III we have indicated, for each filter #1–#7, the numerical real and imaginary values $W_R$ and $W_I$ for each of sets $W_A$, $W_B$ and $W_C$ stored in the associated selectors 4. These values, which can be expressed by bytes since they do not exceed ±127, are not necessarily used directly but can be multiplied by any complex number without changing the frequency response of the respective filter. Thus, it is only the ratio of the values in the pair of columns assigned to any filter that is significant. Corresponding values for zero filter 2 are given in Table IV; Table V provides a set of values $W_C'$ for filter #1 in which the values of the first two columns of Table III are multiplied by five thirds.

TABLE I

| $W_A$ | FILTER #1 | | FILTER #2 | | FILTER #3 | | FILTER #4 | | FILTER #5 | | FILTER #6 | | FILTER #7 | |
|---|---|---|---|---|---|---|---|---|---|---|---|---|---|---|
| | $W_R$ | $W_I$ | $W_R$ | $W_I$ | $W_R$ | $W_I$ | $W_R$ | $W_I$ | $W_R$ | $W_I$ | $W_R$ | $W_I$ | $W_R$ | $W_I$ |
| 1 | −21 | −21 | 0 | −30 | 21 | −21 | 30 | 0 | 21 | 21 | 0 | 30 | −21 | 21 |
| 2 | 0 | −65 | 65 | 0 | 0 | 65 | −65 | 0 | 0 | −65 | 65 | 0 | 0 | 65 |
| 3 | 72 | −72 | 0 | 102 | −72 | −72 | 102 | 0 | −72 | 72 | 0 | −102 | 72 | 72 |
| 4 | 127 | 0 | −127 | 0 | 127 | 0 | −127 | 0 | 127 | 0 | −127 | 0 | 127 | 0 |
| 5 | 90 | 90 | 0 | −127 | −90 | 90 | 127 | 0 | −90 | −90 | 0 | 127 | 90 | −90 |
| 6 | 0 | 102 | 102 | 0 | 0 | −102 | −102 | 0 | 0 | 102 | 102 | 0 | 0 | −102 |
| 7 | −46 | 46 | 0 | 65 | 46 | 46 | 65 | 0 | 46 | −46 | 0 | −65 | −46 | −46 |
| 8 | −30 | 0 | −30 | 0 | −30 | 0 | −30 | 0 | −30 | 0 | −30 | 0 | −30 | 0 |

TABLE II

| $W_B$ | FILTER #1 | | FILTER #2 | | FILTER #3 | | FILTER #4 | | FILTER #5 | | FILTER #6 | | FILTER #7 | |
|---|---|---|---|---|---|---|---|---|---|---|---|---|---|---|
| | $W_R$ | $W_I$ | $W_R$ | $W_I$ | $W_R$ | $W_I$ | $W_R$ | $W_I$ | $W_R$ | $W_I$ | $W_R$ | $W_I$ | $W_R$ | $W_I$ |
| 1 | −7 | −27 | 24 | 11 | 11 | −20 | 21 | 0 | 11 | 20 | 24 | −11 | −7 | 22 |
| 2 | 51 | −17 | −33 | 58 | 57 | 14 | −62 | 0 | 57 | −14 | −33 | −58 | 51 | 32 |
| 3 | 75 | 71 | −99 | −62 | −87 | 54 | 102 | 0 | −87 | −54 | −99 | 62 | 75 | −71 |
| 4 | −65 | 114 | 82 | −127 | 28 | −127 | −127 | 0 | 28 | 127 | 82 | 127 | −65 | −114 |
| 5 | −126 | −35 | 127 | 81 | 68 | 112 | 127 | 0 | 68 | −112 | 127 | −81 | −126 | 35 |
| 6 | 2 | −103 | −63 | 98 | −101 | −24 | −102 | 0 | −101 | 24 | −63 | −98 | 2 | 103 |
| 7 | 59 | −14 | −55 | −39 | 50 | −31 | 62 | 0 | 50 | 31 | −55 | 39 | 59 | 14 |
| 8 | 11 | 21 | 17 | −20 | −40 | 22 | −21 | 0 | −40 | −22 | 17 | 20 | 11 | −21 |

TABLE III

| $W_C$ | FILTER #1 | | FILTER #2 | | FILTER #3 | | FILTER #4 | | FILTER #5 | | FILTER #6 | | FILTER #7 | |
|---|---|---|---|---|---|---|---|---|---|---|---|---|---|---|
| | $W_R$ | $W_I$ | $W_R$ | $W_I$ | $W_R$ | $W_I$ | $W_R$ | $W_I$ | $W_R$ | $W_I$ | $W_R$ | $W_I$ | $W_R$ | $W_I$ |
| 1 | 0 | 15 | −11 | 10 | 12 | 3 | 12 | 0 | 12 | −3 | −11 | −10 | 0 | −15 |
| 2 | −36 | −9 | −30 | −41 | −39 | 23 | −44 | 0 | −39 | −23 | −30 | 41 | −36 | 9 |
| 3 | 18 | −60 | 85 | −46 | 21 | −92 | 91 | 0 | 21 | 92 | 85 | 46 | 18 | 60 |
| 4 | 76 | 24 | 48 | 123 | 92 | 109 | −127 | 0 | 72 | −109 | 48 | −123 | 76 | −24 |
| 5 | −24 | 76 | −127 | 33 | −127 | −25 | 127 | 0 | −127 | 25 | −127 | −33 | −24 | −76 |
| 6 | −60 | −20 | −12 | −94 | 76 | −53 | −91 | 0 | 76 | 53 | −12 | 94 | −60 | 20 |
| 7 | 14 | −35 | 49 | 0 | −8 | 45 | 44 | 0 | −8 | −45 | 49 | 0 | 14 | 35 |
| 8 | 12 | 9 | −2 | 15 | −7 | −10 | −12 | 0 | −7 | 10 | −2 | 15 | 12 | −9 |

TABLE IV

| | FILTER #0 | |
|---|---|---|
| W | $W_R$ | $W_I$ |
| 1 | 18 | 0 |
| 2 | 53 | 0 |
| 3 | 96 | 0 |
| 4 | 127 | 0 |
| 5 | 127 | 0 |
| 6 | 96 | 0 |
| 7 | 53 | 0 |
| 8 | 18 | 0 |

TABLE V

| | FILTER #1 | |
|---|---|---|
| $W_C$ | $W_R$ | $W_I$ |
| 1 | 0 | 25 |
| 2 | −60 | −15 |
| 3 | 30 | −100 |
| 4 | 127 | 40 |
| 5 | −40 | 127 |
| 6 | −100 | −33 |
| 7 | 23 | −58 |
| 8 | 20 | 15 |

Our improved adaptive processor has been realized with current digital technology using commercially available MSI and LSI microchips. Suitable time-sharing techniques enable a minimization of the circuitry, especially as concerns the circuitry of FIG. 2, letting the bank of eight Doppler filters 2, 3 be implemented by four printed circuits measuring 230×297 mm, each containing about 45 microchips. The entire processor consists of 35 such printed circuits, encompassing not only the components shown in FIG. 1 but also storage circuits and other elements performing ancillary functions (e.g. synchronization).

We claim:

1. In a surveillance radar provided with a coherent video detector and with a signal extractor, the combination therewith of a digital MTD processor inserted between said video detector and said signal extractor, said processor comprising:

an analog/digital converter connected to said video detector;

a multiplicity of Doppler filters with inputs connected in parallel to said converter;

evaluation means disposed between said filters and said signal extractor;

environment-responsive sensing means for registering clutter distribution for the area surveyed by the radar; and modification means controlled by said sensing means for varying the characteristics of said filters in accordance with clutter conditions prevailing in different regions of the surveyed area, said modification means comprising a plurality of selectors respectively associated with said filters for loading same with one of several stored sets of predetermined weights depending on clutter density, said sensing means including a clutter map controlling said selectors, said filters including a zero filter, said sensing means comprising ground-clutter-measuring means connected to the output of said zero filter for updating said clutter map, wherein said sets include sets of weights being three sets $W_A$, $W_B$, $W_C$ stored in every selector, set $W_A$ pertaining to regions of no ground clutter, set $W_B$ pertaining to regions of light to moderate ground clutter, set $W_C$ pertaining to regions of heavy ground clutter.

2. The combination defined in claim 1, further comprising switch means responsive to said sensing means for disconnecting said zero filter from said evaluation means during surveillance of regions of heavy ground clutter.

3. The combination defined in claim 1 wherein said evaluation means comprises a multiplicity of modulus extractors respectively connected to the outputs of said filters, a multiplicity of threshold circuits respectively connected to the outputs of said modulus extractors, and logical summing means interposed between the outputs of said threshold circuits and said signal extractor.

4. The combination defined in claim 3 wherein each of said threshold circuits comprises a fixed-threshold comparator and an adaptive-threshold comparator, connected in parallel to the output of the respective modulus extractor, and switchover means for alternatively connecting the outputs of said comparators to said summing means, said sensing means including a rain-clutter map controlling said switchover means for excluding said adaptive-threshold comparator during surveillance of regions of low and zero rainfall.

5. The combination defined in claim 4 wherein said threshold circuits are provided with threshold modifiers responsive to commands from said signal extractor for changing the threshold levels of said comparators in a manner tending to maintain a constant false-alarm rate.

6. The combination defined in claim 1 wherein, with k Doppler filters besides said zero filter and k at most equal to seven, each set contains eight weights represented by as many complex numbers with real coefficients $W_R$ and imaginary coefficients $W_I$, the values of said coefficients having ratios substantially corresponding to those of the first k columns of the following Tables I, II and III:

TABLE I

| $W_A$ | FILTER #1 | | FILTER #2 | | FILTER #3 | | FILTER #4 | | FILTER #5 | | FILTER #6 | | FILTER #7 | |
|---|---|---|---|---|---|---|---|---|---|---|---|---|---|---|
|  | $W_R$ | $W_I$ | $W_R$ | $W_I$ | $W_R$ | $W_I$ | $W_R$ | $W_I$ | $W_R$ | $W_I$ | $W_R$ | $W_I$ | $W_R$ | $W_I$ |
| 1 | −21 | −21 | 0 | −30 | 21 | −21 | 30 | 0 | 21 | 21 | 0 | 30 | −21 | 21 |
| 2 | 0 | −65 | 65 | 0 | 0 | 65 | −65 | 0 | 0 | −65 | 65 | 0 | 0 | 65 |
| 3 | 72 | −72 | 0 | 102 | −72 | −72 | 102 | 0 | −72 | 72 | 0 | −102 | 72 | 72 |
| 4 | 127 | 0 | −127 | 0 | 127 | 0 | −127 | 0 | 127 | 0 | −127 | 0 | 127 | 0 |
| 5 | 90 | 90 | 0 | −127 | −90 | 90 | 127 | 0 | −90 | −90 | 0 | 127 | 90 | −90 |
| 6 | 0 | 102 | 102 | 0 | 0 | −102 | −102 | 0 | 0 | 102 | 102 | 0 | 0 | −102 |
| 7 | −46 | 46 | 0 | 65 | 46 | 46 | 65 | 0 | 46 | −46 | 0 | −65 | −46 | −46 |
| 8 | −30 | 0 | −30 | 0 | −30 | 0 | −30 | 0 | −30 | 0 | −30 | 0 | −30 | 0 |

TABLE II

| $W_B$ | FILTER #1 | | FILTER #2 | | FILTER #3 | | FILTER #4 | | FILTER #5 | | FILTER #6 | | FILTER #7 | |
|---|---|---|---|---|---|---|---|---|---|---|---|---|---|---|
|  | $W_R$ | $W_I$ | $W_R$ | $W_I$ | $W_R$ | $W_I$ | $W_R$ | $W_I$ | $W_R$ | $W_I$ | $W_R$ | $W_I$ | $W_R$ | $W_I$ |
| 1 | −7 | −27 | 24 | 11 | 11 | −20 | 21 | 0 | 11 | 20 | 24 | −11 | −7 | 22 |
| 2 | 51 | −17 | −33 | 58 | 57 | 14 | −62 | 0 | 57 | −14 | −33 | −58 | 51 | 32 |
| 3 | 75 | 71 | −99 | −62 | −87 | 54 | 102 | 0 | −87 | −54 | −99 | 62 | 75 | −71 |
| 4 | −65 | 114 | 82 | −127 | 28 | −127 | −127 | 0 | 28 | 127 | 82 | 127 | −65 | −114 |
| 5 | −126 | −35 | 127 | 81 | 68 | 112 | 127 | 0 | 68 | −112 | 127 | −81 | −126 | 35 |
| 6 | 2 | −103 | −63 | 98 | −101 | −24 | −102 | 0 | −101 | 24 | −63 | −98 | 2 | 103 |
| 7 | 59 | −14 | −55 | −39 | 50 | −31 | 62 | 0 | 50 | 31 | −55 | 39 | 59 | 14 |
| 8 | 11 | 21 | 17 | −20 | −40 | 22 | −21 | 0 | −40 | −22 | 17 | 20 | 11 | −21 |

TABLE III

| $W_C$ | FILTER #1 $W_R$ | $W_I$ | FILTER #2 $W_R$ | $W_I$ | FILTER #3 $W_R$ | $W_I$ | FILTER #4 $W_R$ | $W_I$ | FILTER #5 $W_R$ | $W_I$ | FILTER #6 $W_R$ | $W_I$ | FILTER #7 $W_R$ | $W_I$ |
|---|---|---|---|---|---|---|---|---|---|---|---|---|---|---|
| 1 | 0 | 15 | −11 | 10 | 12 | 3 | 12 | 0 | 12 | −3 | −11 | −10 | 0 | −15 |
| 2 | −36 | −9 | −30 | −41 | −39 | 23 | −44 | 0 | −39 | −23 | −30 | 41 | −36 | 9 |
| 3 | 18 | −60 | 85 | −46 | 21 | −92 | 91 | 0 | 21 | 92 | 85 | 46 | 18 | 60 |
| 4 | 76 | 24 | 48 | 123 | 92 | 109 | −127 | 0 | 72 | −109 | 48 | −123 | 76 | −24 |
| 5 | −24 | 76 | −127 | 33 | −127 | −25 | 127 | 0 | −127 | 25 | −127 | −33 | −24 | −76 |
| 6 | −60 | −20 | −12 | −94 | 76 | −53 | −91 | 0 | 76 | 53 | −12 | 94 | −60 | 20 |
| 7 | 14 | −35 | 49 | 0 | −8 | 45 | 44 | 0 | −8 | −45 | 49 | 0 | 14 | 35 |
| 8 | 12 | 9 | −2 | 15 | −7 | −10 | −12 | 0 | −7 | 10 | −2 | 15 | 12 | −9 |

7. The combination defined in claim 6 wherein said zero filter has eight weights with zero imaginary coefficients $W_I$ and with real coefficients $W_R$ having ratios substantially equaling 18:53:96:127:127:96:53:18.

* * * * *